(12) United States Patent
Sun et al.

(10) Patent No.: US 11,647,688 B1
(45) Date of Patent: May 16, 2023

(54) INTELLIGENT SEEDING AND FERTILIZING MACHINE FOR INTERCROPPING

(71) Applicant: Liaoning Academy of Agricultural Sciences, Shenyang (CN)

(72) Inventors: Zhanxiang Sun, Shenyang (CN); Liangshan Feng, Shenyang (CN); Ning Yang, Shenyang (CN); Chen Feng, Shenyang (CN); Yue Men, Shenyang (CN); Wei Bai, Shenyang (CN); Yaosheng Wang, Shenyang (CN); Zhe Zhang, Shenyang (CN); Mingzhu Zhao, Shenyang (CN); Xianglong Sun, Shenyang (CN)

(73) Assignee: Liaoning Academy of Agricultural Sciences, Shenyang (CN)

( * ) Notice: Subject to any disclaimer, the term of this patent is extended or adjusted under 35 U.S.C. 154(b) by 0 days.

(21) Appl. No.: 17/990,949

(22) Filed: Nov. 21, 2022

(30) Foreign Application Priority Data

Dec. 3, 2021 (CN) .......................... 202111466051.X

(51) Int. Cl.
*A01C 7/06* (2006.01)
*A01C 7/08* (2006.01)
(Continued)

(52) U.S. Cl.
CPC ................ *A01C 7/06* (2013.01); *A01C 5/064* (2013.01); *A01C 5/066* (2013.01); *A01C 7/08* (2013.01);
(Continued)

(58) Field of Classification Search
CPC .. A01C 7/06; A01C 7/08; A01C 5/064; A01C 5/066; G05B 19/182; G05B 2219/36263
See application file for complete search history.

(56) References Cited

U.S. PATENT DOCUMENTS 4,202,474 A * 5/1980 Dreyer ................. A01B 73/005
222/623
5,331,907 A * 7/1994 Beaujot .................... A01C 7/06
111/194
(Continued)

FOREIGN PATENT DOCUMENTS

AU 2020223770 A1 3/2021
CN 103828533 A 6/2014
(Continued)

OTHER PUBLICATIONS

First Office Action issued in counterpart Chinese Patent Application No. 202111466051.X, dated Jun. 29, 2022.

*Primary Examiner* — Jamie L McGowan
(74) *Attorney, Agent, or Firm* — Westbridge IP LLC

(57) ABSTRACT

An intelligent seeding and fertilizing machine for intercropping comprises: a fixed frame, a plurality of seeding devices arranged in parallel in the fixed frame and a plurality of guide columns fixedly connected in the fixed frame, where one end of fixed frame close to a cutting mechanism is provided with a lifting plate, a side of the fixed frame is in sliding contact with an inner wall of a lifting groove, the lifting groove is provided with a lifting screw, a lifting motor is fixedly connected to a top surface of the lifting plate; each seeding device includes a frame, and a bottom surface of the frame is respectively provided with a cutting mechanism, a cleaning mechanism, a furrowing mechanism, a fertilizing mechanism, a seeding mechanism and a soil covering mechanism, and the above mechanisms and the lifting motor are all electrically connected with a control system.

8 Claims, 12 Drawing Sheets

(51) Int. Cl.
*A01C 5/06* (2006.01)
*G05B 19/18* (2006.01)

(52) U.S. Cl.
CPC .. *G05B 19/182* (2013.01); *G05B 2219/36263* (2013.01)

(56) References Cited

U.S. PATENT DOCUMENTS

| | | | | |
|---|---|---|---|---|
| 5,562,054 | A * | 10/1996 | Ryan | A01C 5/062 111/194 |
| 6,032,593 | A * | 3/2000 | Wendling | A01C 5/064 111/924 |
| 6,935,256 | B1 * | 8/2005 | Meyer | A01C 7/081 111/177 |
| 2007/0205213 | A1 * | 9/2007 | Audette | A01C 7/06 221/185 |
| 2011/0232553 | A1 * | 9/2011 | Audette | A01C 7/06 111/170 |
| 2014/0109813 | A1 * | 4/2014 | Wilhelmi | A01C 7/046 111/185 |
| 2018/0249624 | A1 * | 9/2018 | Gentili | A01C 7/06 |
| 2019/0021215 | A1 * | 1/2019 | Roberge | A01C 7/206 |

FOREIGN PATENT DOCUMENTS

| | | |
|---|---|---|
| CN | 105766109 A | 7/2016 |
| CN | 206585959 U | 10/2017 |
| CN | 109511326 A | 3/2019 |

\* cited by examiner

INTELLIGENT SEEDING AND FERTILIZING MACHINE FOR INTERCROPPING

CROSS-REFERENCE TO RELATED APPLICATIONS

This present application claims priority to Chinese Patent Application No. 202111466051.X, filed on Dec. 3, 2021, the contents of which are hereby incorporated by reference.

TECHNICAL FIELD

The present application relates to the field of agricultural machinery, and in particular to an intelligent seeding and fertilizing machine for intercropping.

BACKGROUND

Agricultural machinery refers to all kinds of machinery applied in crop planting and animal husbandry production, as well as the initial processing and treatment of agricultural and livestock products, and can improve work efficiency and crop quality and yield. A planting pattern where various crops are generally sown at the same time is referred to as intercropping. The intercropping can improve the land utilization rate, increase the interception and absorption of sunlight, and reduce the waste of light energy. Moreover, intercropping of two crops can also produce complementary effects, such as marginal superiority of long-stalked crops which adopt in wide and narrow rows or strip intercropping.

At present, while an intercropping seeder is sowing, row spaces are distinct, failing to achieve the effect of staggered planting to improve the land utilization rate, and therefore has no fertilization function.

Therefore, it is urgent to have an intelligent seeding and fertilizing machine for intercropping to solve the above problems.

SUMMARY

The objective of the present application is to provide an intelligent seeding and fertilizing machine for intercropping, so as to solve the problems existing in the prior art.

To achieve the above objective, the present application provides the following scheme: an intelligent seeding and fertilizing machine for intercropping includes a fixed frame, where a plurality of seeding devices are arranged in the fixed frame in parallel, and respectively used for sowing various seeds for intercropping and alternately sowing at intervals; each seeding device includes a frame, a plurality of guide columns are fixedly connected in the fixed frame, and a plurality of the guide columns penetrate through a side surface of the frame, and a bottom surface of the frame is respectively provided with a cutting mechanism, a cleaning mechanism, a furrowing mechanism, a fertilizing mechanism, a seeding mechanism and a soil covering mechanism in sequence; one end of the fixed frame close to the cutting mechanism is provided with a lifting plate, a bottom surface of the lifting plate is fixedly connected with a plurality of guide wheels; one side of the lifting plate is provided with a lifting groove; a side surface of the fixed frame is in sliding contact with an inner wall of the lifting groove; a top of the fixed frame is provided with a lifting hole; a top of the lifting plate is fixedly connected with a lifting motor; a lifting screw is arranged in the lifting groove; an outer wall of the lifting screw is connected with an inner wall of the lifting hole through threads; a top of the lifting screw penetrates through the top surface of the lifting groove and is fixedly connected with an output end of the lifting motor; a bottom surface of the lifting screw is rotatably connected with a bottom surface of the lifting groove; the other side of the lifting plate is fixedly connected with a connecting seat, the connecting seat is connected with agricultural machinery through bolts; and the lifting motor, the cutting mechanism, the cleaning mechanism, the furrowing mechanism, the fertilizing mechanism, the seeding mechanism and the soil covering mechanism are all electrically connected with a control system.

Optionally, the cutting mechanism includes two oppositely arranged cutting seats, top surfaces of the two cutting seats are respectively connected with bottom surface of the frame, bottoms of the two cutting seats are provided with a cutting shaft, one end of the cutting shaft penetrate through one of the cutting seats and is connected with a cutting motor in a transmission way, the other end of the cutting shaft is rotatably connected with a side surface of the other cutting seat, the cutting motor is fixedly connected with the side surface of one of the cutting seats, an output end of the cutting motor is fixedly connected with the cutting shaft, a middle part of the cutting shaft is sleeved with a cutting disc, and the cutting disc is fixedly connected with an outer wall of the cutting shaft, and a peripheral face of the cutting disc is circumferentially provided with a plurality of arc-shaped cutting openings at equal intervals.

Optionally, the cleaning mechanism includes two oppositely arranged cleaning seats, and top surfaces of the two cleaning seats are in contact with the bottom surface of the frame, bottom surfaces of the two cleaning seats are fixedly connected with a cleaning plate; a bottom of the cleaning plate is provided with two cleaning gears meshing with each other; a top of each cleaning gear is fixedly connected with a cleaning shaft; a top of the cleaning shaft penetrates through the cleaning plate and is connected with a cleaning motor in a transmission way; the cleaning motor is fixedly connected with the bottom of the frame; and an output end of the cleaning motor is fixedly connected with the top of the cleaning shaft.

Optionally, the furrowing mechanism includes a furrowing plate, a bottom of the furrowing plate is fixedly connected with two oppositely arranged furrowing seats, and bottoms of the furrowing seats are provided with a furrowing shaft, one end of the furrowing shaft runs through one of the furrowing seats and is connected with a furrowing motor in transmission, the other end of furrowing shaft is rotatably connected with a side of the other furrowing seat, and the furrowing motor is fixedly connected with a side of one of the furrowing seats; an output end of the furrowing motor is fixedly connected with the furrowing shaft; and a middle part of the furrowing shaft is sleeved with a furrowing disc, the furrowing disc is fixedly connected with an outer wall of the furrowing shaft; a peripheral face of the furrowing disc is circumferentially fixedly connected with a plurality of furrowing teeth at equal intervals; and tops of the furrowing seats are provided with a limiting mechanism.

Optionally, the limiting mechanism includes a limiting motor, the limiting motor is fixedly connected with a top surface of the frame, and the top surface of the frame is provided with a rectangular hole, a rectangular block is arranged in the rectangular hole; an outer wall of the rectangular block is in sliding contact with an inner wall of the rectangular hole; a bottom surface of the rectangular block is fixedly connected with a top surface of the furrowing plate; a top surface of the rectangular block is provided with a limiting hole; and an output end of the limiting motor is fixedly connected with a limiting shaft, and the limiting shaft is connected with an inner wall of the limiting hole through threads.

Optionally, the fertilizing mechanism includes a positioning cylinder, a bottom surface of the positioning cylinder is fixedly connected with the top surface of the frame, and a fertilizer loading cylinder is arranged in the positioning cylinder, a top outer wall of the fertilizer loading cylinder is fixedly connected with a top inner wall of the positioning cylinder, a bottom of fertilizer loading cylinder is provided with a conical structure, and a bottom surface of the fertilizer loading cylinder is provided with a discharge hole, and the bottom surface of fertilizer loading cylinder is fixedly connected with a grinding cylinder, a bottom surface of the grinding cylinder is fixedly connected with the top surface of the frame. A top of an inner wall of the grinding cylinder is provided with an inverted conical structure, the discharge hole is communicated with an inner cavity of the grinding cylinder, the top surface of the frame is fixedly connected with a grinding motor, and an output end of the grinding motor is fixedly connected with a conical block, the conical block is matched with the shape of an inner cavity of a top of the grinding cylinder, a gap is provided between the conical block and the top of the inner wall of the grinding cylinder, the top surface of the frame located in the grinding cylinder is provided with an inclined annular groove, and a bottom surface of the annular groove is provided with a fertilizer discharging hole; and an outlet end of the fertilizer discharging hole is fixedly connected with a fertilizer guiding tube.

Optionally, a bottom surface of the conical block is fixedly connected with a connecting rod, and a bottom surface of the connecting rod is fixedly connected with a sweeping rod, and a bottom surface of the sweeping rod is in sliding contact with the bottom surface of the annular groove.

Optionally, the seeding mechanism includes a seeding shell, a bottom of the seeding shell is provided with a conical structure, a bottom surface of the seeding shell is fixedly connected with the top surface of the frame, the top surface of the frame is provided with a communication hole, and the bottom surface of the frame is fixedly connected with a rectangular shell, a seed metering roller is arranged in the rectangular shell, and a peripheral surface of the seed metering roller is circumferentially provided with a plurality of storage tanks, and an outer wall of the seed metering roller is in sliding contact with an inner wall of the rectangular shell. One end of the seed metering roller is rotatably connected with the inner wall of the rectangular shell, and the other end of the seed metering roller penetrates through the inner wall of the rectangular shell and is fixedly connected with an output end of a seeding motor, and the seeding motor is fixedly connected with an outer wall of the rectangular shell.

Optionally, the soil covering mechanism includes two oppositely arranged hinge seats, top surfaces of the two hinge seats are fixedly connected with the bottom surface of the frame, a hinge shaft is arranged between the two hinge seats, two ends of the hinge shaft are fixedly connected with sides of the two hinge seats respectively, two hinge rods are sleeved on the hinge seats, and soil covering rollers are arranged at bottoms of the two hinge rods, and the two ends of the soil covering rollers are rotatably connected with sides of the two hinge rods respectively.

Optionally, the control system includes a single chip microcomputer, and a bottom of a side of the lifting plate is provided with a displacement sensor. The single chip microcomputer is electrically connected with the lifting motor, the cutting motor, the cleaning motor, the furrowing motor, the limiting motor, the grinding motor, the displacement sensor and the seeding motor respectively.

The present application discloses the following technical effects. A plurality of seeding devices, which are independently working, are arranged in the fixed frame for sowing a variety of crops, respectively, and are applied to intercropping, so that seeds of two crops are simultaneously sown, and therefore work efficiency is improved. The fixed frame positions a plurality of frames, and the guide columns position the frames, so that the whole seeding device is more stable in a seeding process. The lifting plate limits the whole seeding mechanism. In a process of transporting the fertilizing machine to farmland, the lifting motor and the lifting screw drive the fixed frame to move up as a whole, so that the seeding mechanism moves up, and the guide wheels contact and slide with the ground. In this way, the seeding mechanism is prevented from being damaged during transportation. The cutting mechanism cuts straws to avoid accumulation of straws in the seeding mechanism. The cleaning mechanism cleans cut straw, so that the straw moves to both sides respectively, so that a large amount of straw is not accumulated on the ground to be furrowed, and an influence of excessive accumulation of straw in the planting groove on seed development can be avoided. With the help of the cutting mechanism, pre-furrowing is allowed during the straw cutting process and the working intensity of the furrowing mechanism is reduced and the overall working efficiency is improved. At the same time, with this arrangement, the rotary tillage work is saved, an effect of preserving soil moisture is achieved, the disturbance to the land surface is reduced, the soil humidity is maintained to the greatest extent, and the seed germination rate is improved. The fertilizing mechanism fertilizes in furrows, and further grinds the fertilizer to enhance the effect of fertilizer in crop growth. The soil covering mechanism backfills soil into the furrows to cover seeds, and the whole machine achieves integrated seeding, greatly improves seeding efficiency and saves cost.

BRIEF DESCRIPTION OF THE DRAWINGS

In order to more clearly explain the embodiments of the present application or the technical solutions in the prior art, the following will briefly introduce the drawings to be used in the embodiments. Obviously, the drawings in the following description are only some embodiments of the present application. For those of ordinary skill in the art, other drawings may be obtained according to these drawings without any creative efforts.

DETAILED DESCRIPTION OF THE EMBODIMENTS

Figure 1:
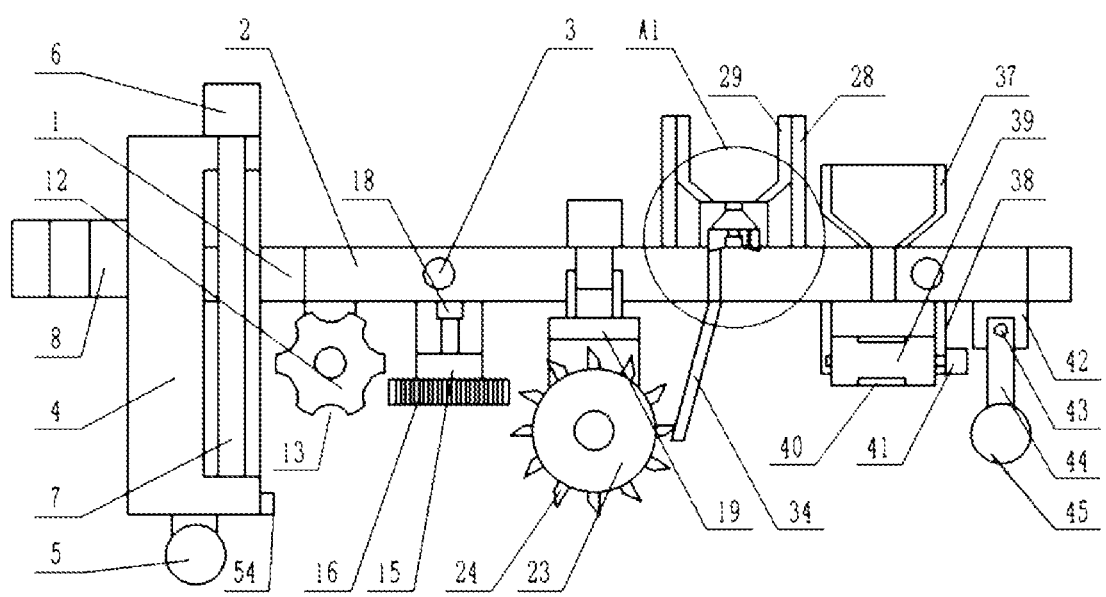
FIG. 1 is a schematic structural diagram of embodiment 1 of the present application.
Figure 2:
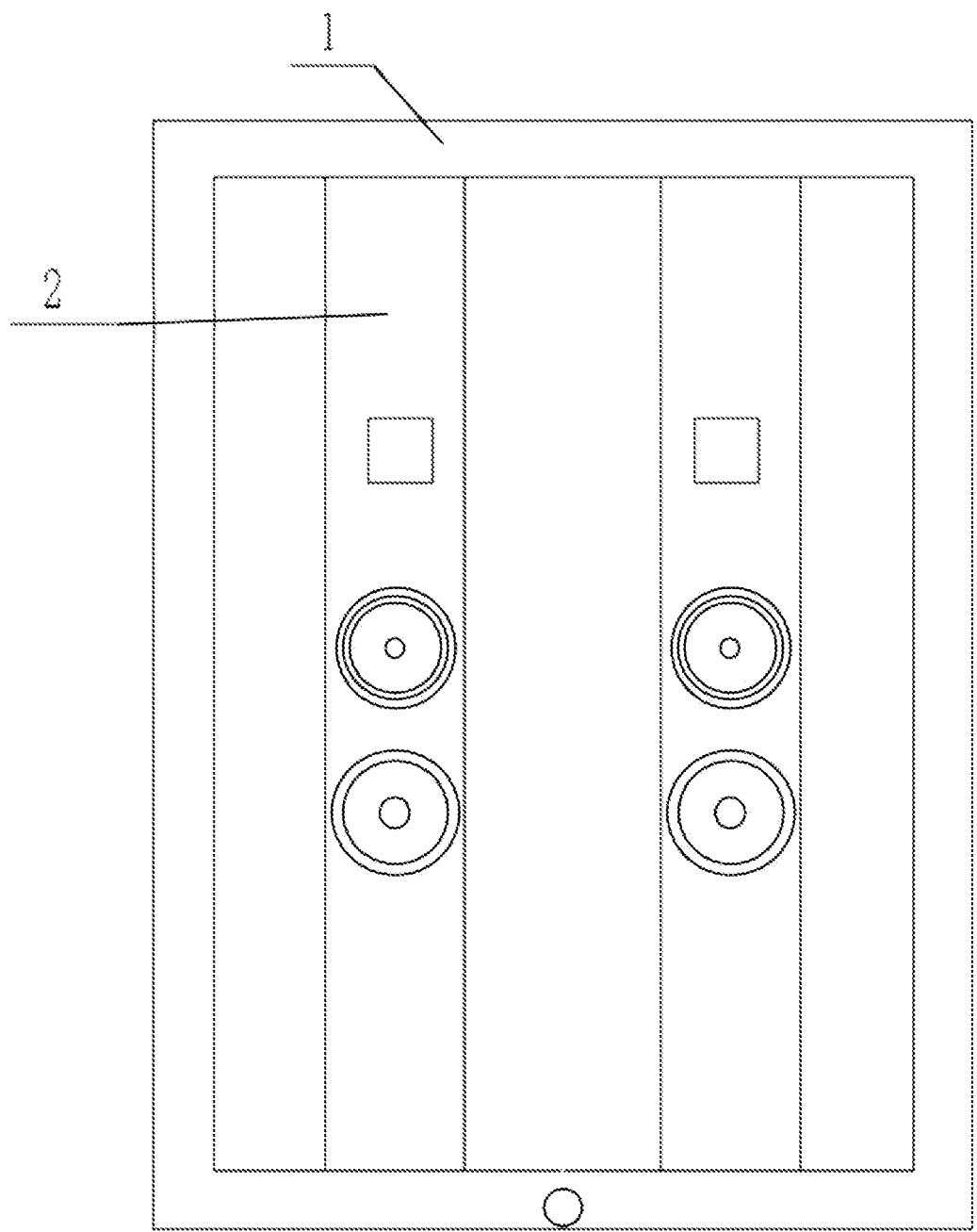
FIG. 2 is a plan view of a fixed frame in embodiment 1 of the present application.
Figure 3:
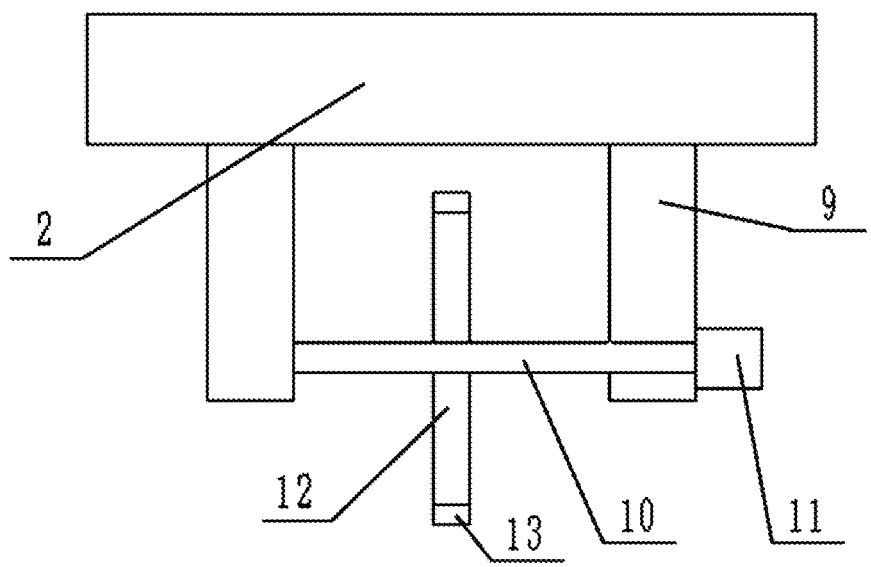
FIG. 3 is a structural diagram of a cutting mechanism in embodiment 1 of the present application.
Figure 4:
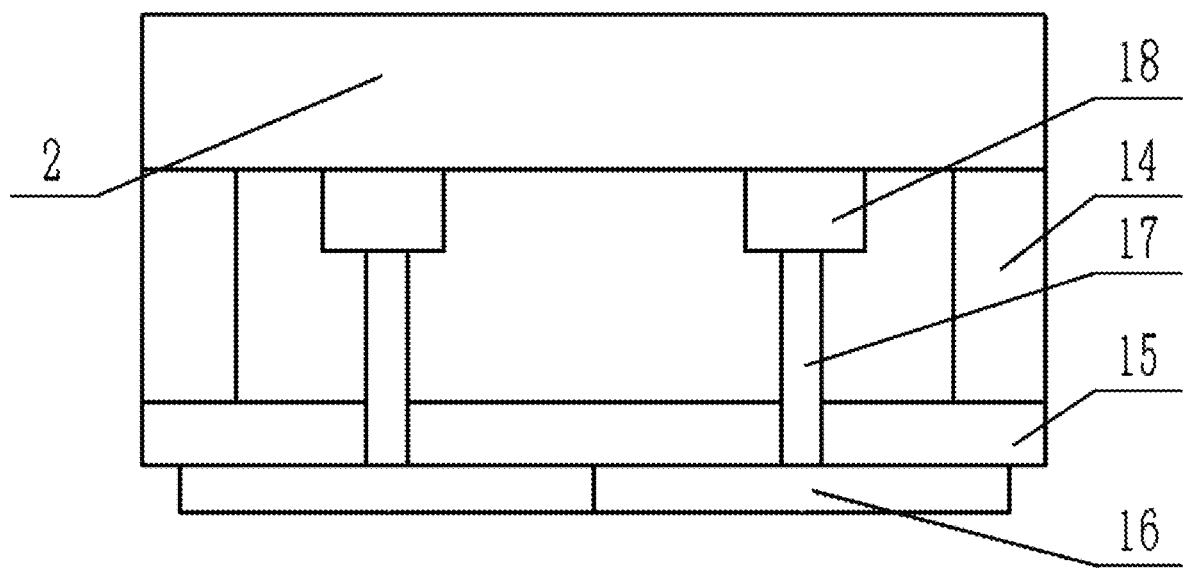
FIG. 4 is a schematic structural diagram of a cleaning mechanism in embodiment 1 of the present application.
Figure 5:
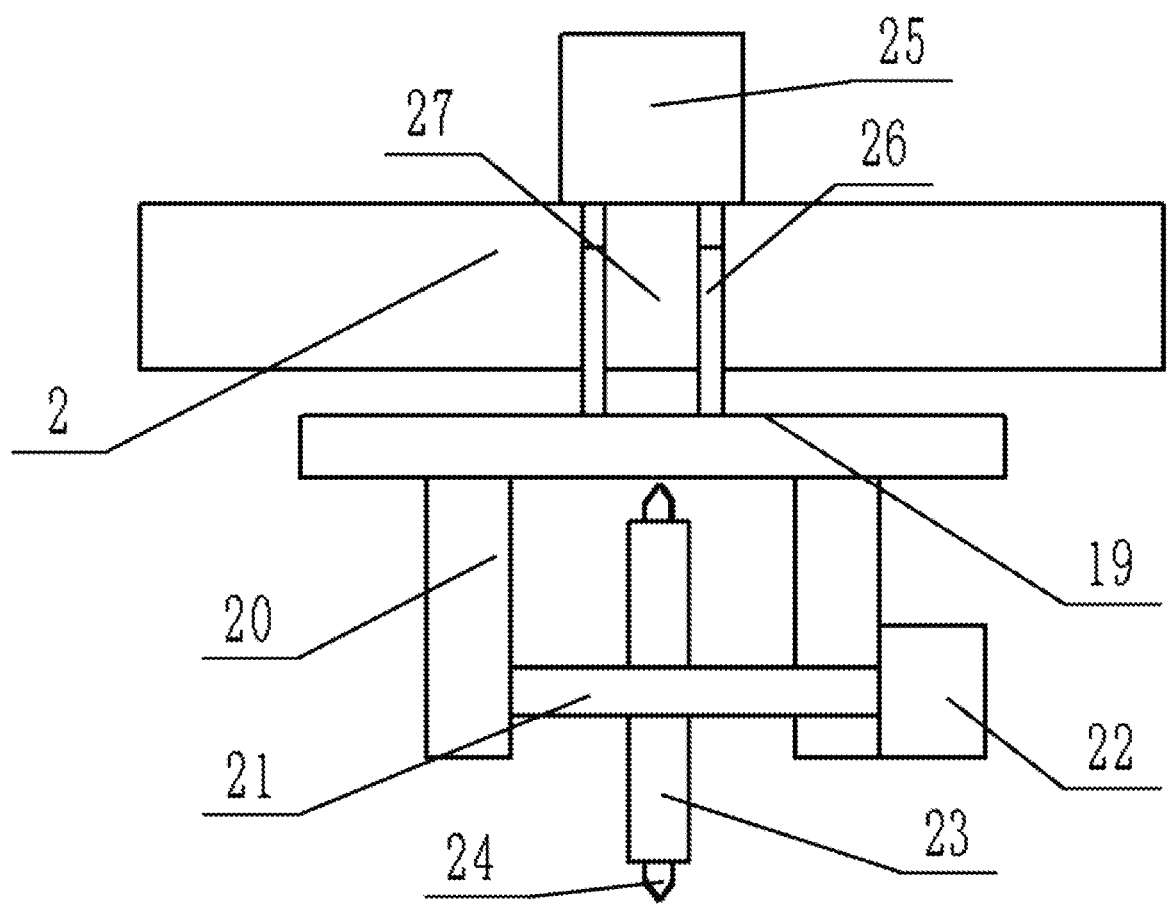
FIG. 5 is a schematic structural diagram of a furrowing mechanism in embodiment 1 of the present application.
Figure 6:
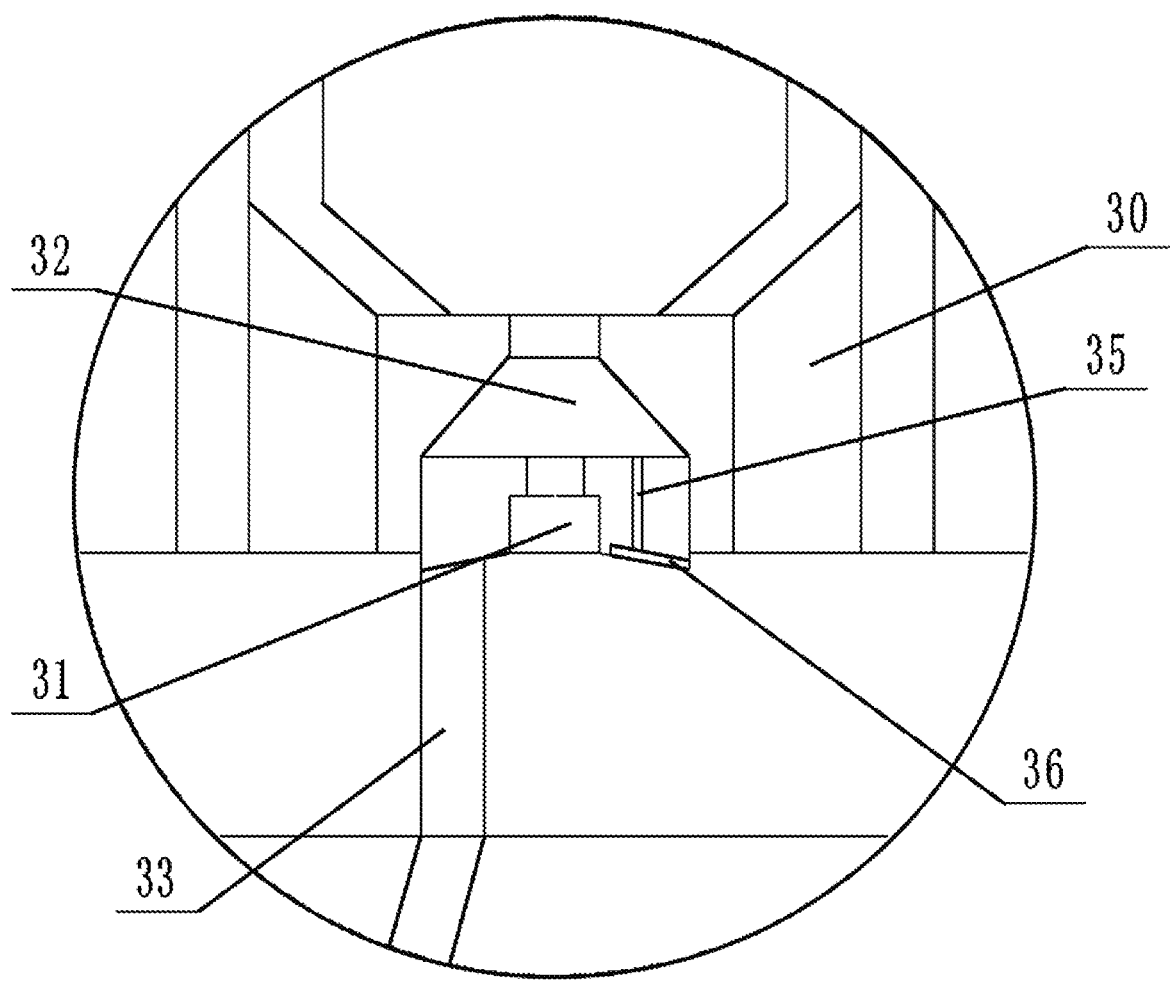
FIG. 6 is a partial enlarged view of A1 in embodiment 1 of the present application.
Figure 7:
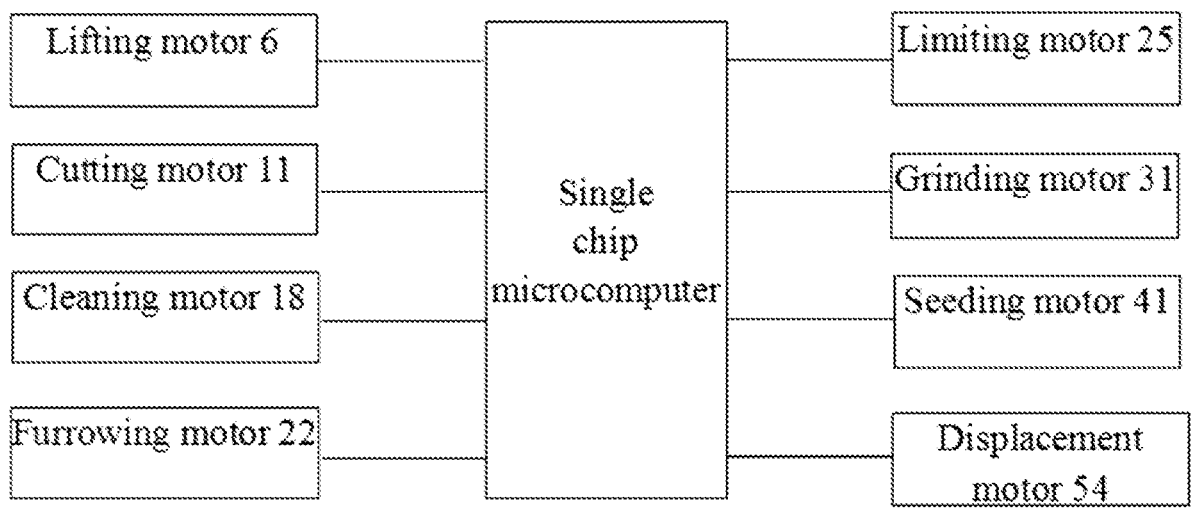
FIG. 7 is a schematic structural diagram of a control system in embodiment 1 of the present application.

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

In order to make the above objectives, features and advantages of the present application more obvious and understandable, the present application will be explained in further detail below with reference to the drawings and detailed description.

Embodiment 1

With reference to FIGS. 1-7, the present application provides an intelligent seeding and fertilizing machine for intercropping. The intelligent seeding and fertilizing machine for intercropping includes a fixed frame 1, a plurality of seeding devices are arranged in parallel the fixed frame 1, and a plurality of the seeding devices are respectively used for sowing various seeds for intercropping and alternately sowing at intervals.

Each seeding device includes a frame 2, a plurality of guide columns 3 are fixedly connected in the fixed frame 1, and the guide columns 3 penetrate through a side of the frame 2. A bottom surface of the frame 2 is provided with a cutting mechanism, a cleaning mechanism, a furrowing mechanism, a fertilizing mechanism, a seeding mechanism and a soil covering mechanism in sequence. One end of the fixed frame 1 close to the cutting mechanism is provided with a lifting plate 4, a bottom of lifting plate 4 is fixedly connected with a plurality of guide wheels 5; one side of the lifting plate 4 is provided with a lifting groove; a side of the fixed frame 1 is in sliding contact with an inner wall of the lifting groove; a top surface of the fixed frame 1 is provided with a lifting hole; a top surface of the lifting plate 4 is fixedly connected with a lifting motor 6; a lifting screw 7 is arranged in the lifting groove; an outer wall of the lifting screw 7 is connected with an inner wall of the lifting hole through threads; a top of the lifting screw penetrates through a top surface of the lifting groove and is fixedly connected with an output end of the lifting motor 6; a bottom surface of the lifting screw 7 is rotatably connected with a bottom surface of the lifting groove; the other side of the lifting plate 4 is fixedly connected with a connecting seat 8; the connecting seat 8 is connected with agricultural machinery through bolts; and the lifting motor 6, the cutting mechanism, the cleaning mechanism, the furrowing mechanism, the fertilizing mechanism, the seeding mechanism and the soil covering mechanism are all electrically connected with a control system.

A plurality of seeding devices independently working are arranged in the fixed frame 1 for sowing a variety of crops, respectively and as for intercropping, two crops are simultaneously sown at one time, so that the working efficiency is improved. The fixed frame 1 positions a plurality of machine frames 2; the guide columns 3 position the machine frames 2, so that the whole seeding device is more stable in a sowing process. The lifting plate 4 limits the whole seeding mechanism. While a fertilizer machine is transported to farmland, the lifting motor 6 is driven, the lifting screw 7 drives the fixed frame 1 to move up integrally, thus driving the seeding mechanism to move up, so that the guide wheels 5 contact and slide with the ground, thus avoiding damage to the seeding mechanism in the transportation process. The cutting mechanism cuts straws to avoid accumulation of straw in the seeding mechanism; and the cleaning mechanism cleans cut straw, so that the straw moves to both sides respectively, a large amount of straw is not accumulated on the ground to be furrowed, and a negative influence of excessive accumulation of straw in the planting groove on seed development is avoided. With the help of the cutting mechanism, pre-furrowing is allowed in a process of cutting straw, which reduces the working intensity of the furrowing mechanism and improves the overall working efficiency. At the same time, this arrangement, the rotary tillage work is saved, an effect of preserving soil moisture is achieved, the disturbance to the land surface is reduced, the soil moisture is maintained to the greatest extent, and the seed germination rate is improved. The fertilizing mechanism fertilizes in furrows, further grinds the fertilizer, and improves the effect of the fertilizer in promoting the development of crops. The soil covering mechanism backfills soil into the furrows and covers the seeds, so the whole machine realizes the integrated seeding effect, greatly improves the seeding efficiency and saves the cost.

In an embodiment, the cutting mechanism includes two oppositely arranged cutting seats 9, and top surfaces of the two cutting seats 9 are fixedly connected with a bottom surface of the frame 2, respectively, and the bottoms of the two cutting seats 9 are provided with a cutting shaft 10, one end of the cutting shaft 10 passes through one of the cutting seats 9 and is connected with a cutting motor 11 in a transmission way, while the other end of the cutting shaft 10 is rotatably connected with a side surface of the other cutting seat 9, and the cutting motor 11 is fixed on the side of one of the cutting seats 9, an output end of the cutting motor 11 is fixedly connected with the cutting shaft 10, a middle of the cutting shaft 10 is sleeved with a cutting disc 12, the cutting disc 12 is fixedly connected with an outer wall of the cutting shaft 10, and a plurality of arc-shaped cutting openings 13 are circumferentially formed on a peripheral surface of the cutting disc 12 at equal intervals.

Providing an opening on the cutting disc 12 not only improves the effect of pre-furrowing on the land, but also makes the opening buckle straw during the rotation of the cutting disc 12, thus improving the cutting efficiency of straw.

In an embodiment, the cleaning mechanism includes two oppositely arranged cleaning seats 14, top surfaces of the cleaning seats 14 are fixedly connected with the bottom surface of the frame 2, and bottom surfaces of the cleaning seats 14 are fixedly connected with a cleaning plate 15. A bottom of the cleaning plate 15 is provided with two cleaning gears 16 meshing with each other, a top of each cleaning gear 16 is fixedly connected with a cleaning shaft 17, a top of the cleaning shaft 17 penetrates through the cleaning plate 15 and is in transmission connection with a cleaning motor 18, the cleaning motor 18 is fixedly connected with the bottom surface of the frame 2, and an output end of the cleaning motor 18 is fixedly connected with the top of the cleaning shaft 17.

The two cleaning motors 18 are arranged to turn over, so that the two cleaning gears 16 rotate reversely. At the same time, the two cleaning motors 18 are used for driving, which enhances torque, improves the effect of cleaning straw, and prevents jamming and accumulation of straw.

In an embodiment, the furrowing mechanism includes a furrowing plate 19, a bottom of the furrowing plate 19 is fixedly connected with two oppositely arranged furrowing seats 20, and a bottom of each furrowing seat 20 is provided with a furrowing shaft 21. One end of the furrowing shaft 21 penetrates through one of the furrowing seats 20 and is connected with a furrowing motor 22 in transmission, and the other end of the furrowing shaft 21 is rotatably connected with a side of the other furrowing seat 20, and the furrowing motor 22 is fixedly connected to a side of one of the furrowing seats 20. An output end of the furrowing motor 22 is fixedly connected with the furrowing shaft 21, a middle part of the furrowing shaft 21 is sleeved with a furrowing disc 23, the furrowing disc 23 is fixedly connected with an outer wall of the furrowing shaft 21, a plurality of furrowing teeth 24 are circumferentially fixedly connected with a peripheral surface of the furrowing disc 23 at equal intervals, and atop of each furrowing seat 20 is provided with a limiting mechanism.

In an embodiment, the limiting mechanism includes a limiting motor 25, the limiting motor 25 is fixedly connected with a top surface of the frame 2, and the top surface of the frame 2 is provided with a rectangular hole, a rectangular block 26 is arranged in the rectangular hole, an outer wall of the rectangular block 26 is in sliding contact with an inner wall of the rectangular hole, a bottom surface of the rectangular block 26 is fixedly connected with a top surface of the furrowing plate 19, a top surface of the rectangular block 26 is provided with a limiting hole, an output end of the limiting motor 25 is fixedly connected with a limiting shaft 27, and the limiting shaft 27 is connected with an inner wall of the limiting hole by threads.

The connection between the limiting shaft 27 and inner wall of the limiting hole by threads can adjust a furrowing depth of the furrowing disc 23, and enhance the adaptability to different seeds.

In an embodiment, the fertilizing mechanism includes a positioning cylinder 28, a bottom of the positioning cylinder 28 is fixedly connected with the top surface of the frame 2, and a fertilizer loading cylinder 29 is arranged in the positioning cylinder 28, a top outer wall of the fertilizer loading cylinder 29 is fixedly connected with a top inner wall of the positioning cylinder 28, and a bottom of the fertilizer loading cylinder 29 has a conical structure and is provided with a discharge hole, and a bottom surface of the fertilizer loading cylinder 29 is fixedly connected with a grinding cylinder 30, a bottom surface of the grinding cylinder 30 is connected with the top surface of the frame 2. A top of the inner wall of the grinding barrel 30 has an inverted conical structure, and the discharge hole communicates with an inner cavity of the grinding barrel 30. The top surface of the frame 2 is fixedly connected with a grinding motor 31, and an output end of the grinding motor 31 is fixedly connected with a conical block 32, the conical block 32 is matched with a shape of the inner cavity at the top of the grinding barrel 30. There is a gap between the conical block 32 and the top of the inner wall of the grinding barrel 30. The top surface of the frame 2 located in the grinding barrel 30 is provided with an inclined annular groove, a bottom surface of the annular groove is provided with a fertilizer discharge hole 33, an outlet end of the fertilizer discharge hole 33 is fixedly connected with a fertilizer guiding tube 34.

The fertilizer guiding tube 34 is arranged just opposite to planting furrows opened by the furrowing disc 23, so that the ground fertilizer is introduced into the furrows. When the grinding motor 31 does not rotate, because a particle size of the fertilizer itself is close to the gap, the fertilizer is piled up under the action of gravity, so that the fertilizer does not leak. When the grinding motor 31 is turned on, the conical block 32 and the inner cavity of the grinding cylinder 30 rotate mutually to grind the fertilizer and make the fertilizer flow down into the furrows. At the same time, when the grinding motor 31 rotates faster, more fertilizer is introduced and the amount of fertilizer is further controlled.

In an embodiment, a bottom surface of the conical block 32 is fixedly connected with a connecting rod 35, and a bottom surface of the connecting rod 35 is fixedly connected with a sweeping rod 36, and a bottom surface of the sweeping rod 36 is in sliding contact with the bottom surface of the annular groove.

Such an arrangement avoids the accumulation of chemical fertilizers in the annular groove. In an embodiment, the seeding mechanism includes a seeding shell 37, a bottom of seeding shell 37 is arranged in a conical structure, a bottom surface of seeding shell 37 is fixedly connected with the top surface of the frame 2, the top surface of the frame 2 is provided with a communication hole, and the bottom surface of the frame 2 is fixedly connected with a rectangular shell 38, a seed metering roller 39 is arranged in the rectangular shell 38, and a plurality of storage tanks 40 are circumferentially arranged on a peripheral surface of the seed metering roller 39, and an outer wall of the seed metering roller 39 is in sliding contact with an inner wall of the rectangular shell 38. One end of the seed metering roller 39 is rotatably connected to an inner wall of the rectangular shell 38, and the other end of the seed metering roller 39 penetrates through the inner wall of the rectangular shell 38 and is fixedly connected with an output end of a seeding motor 41, and the seeding motor 41 is fixedly connected to an outer wall of the rectangular shell 38.

The planting spacing is adjusted by controlling a rotation speed of the seeding motor 41.

In an embodiment, the soil covering mechanism includes two oppositely arranged hinge seats 42, top surfaces of the hinge seats 42 are fixedly connected with the bottom surface of the frame 2, and a hinge shaft 43 is arranged between the two hinge seats 42, and two ends of the hinge shaft 43 are fixedly connected with sides of the two hinge seats 42, and two hinged rods 44 are sleeved on the hinge seats 42, and bottoms of the two hinged rods 44 are provided with soil covering rollers 45, and the two ends of the soil covering rollers 45 are respectively rotatably connected with sides of the two hinge seats.

In an embodiment, the control system includes a single chip microcomputer, and the bottom of the side of the lifting plate 4 is provided with a displacement sensor 54. The single chip microcomputer is electrically connected with the lifting motor 6, the cutting motor 11, the cleaning motor 18, the furrowing motor 22, the limiting motor 25, the grinding motor 31, the displacement sensor 54 and the seeding motor 41, respectively.

The displacement sensor 54 detects the relative displacement between the furrowing disc 23 and the guide wheels 5, thereby controlling the furrowing depth.

Embodiment 2

Figure 8:
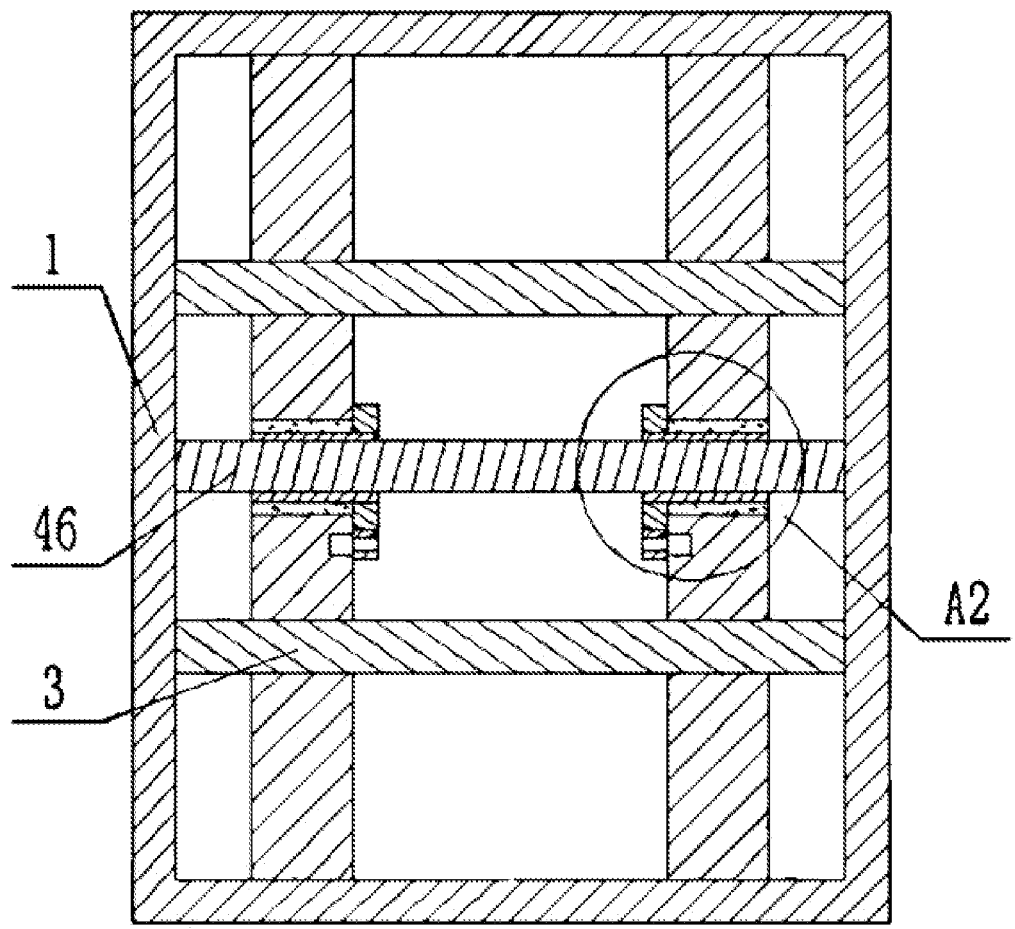
FIG. 8 is a structural diagram of embodiment 2 of the present application.
Figure 9:
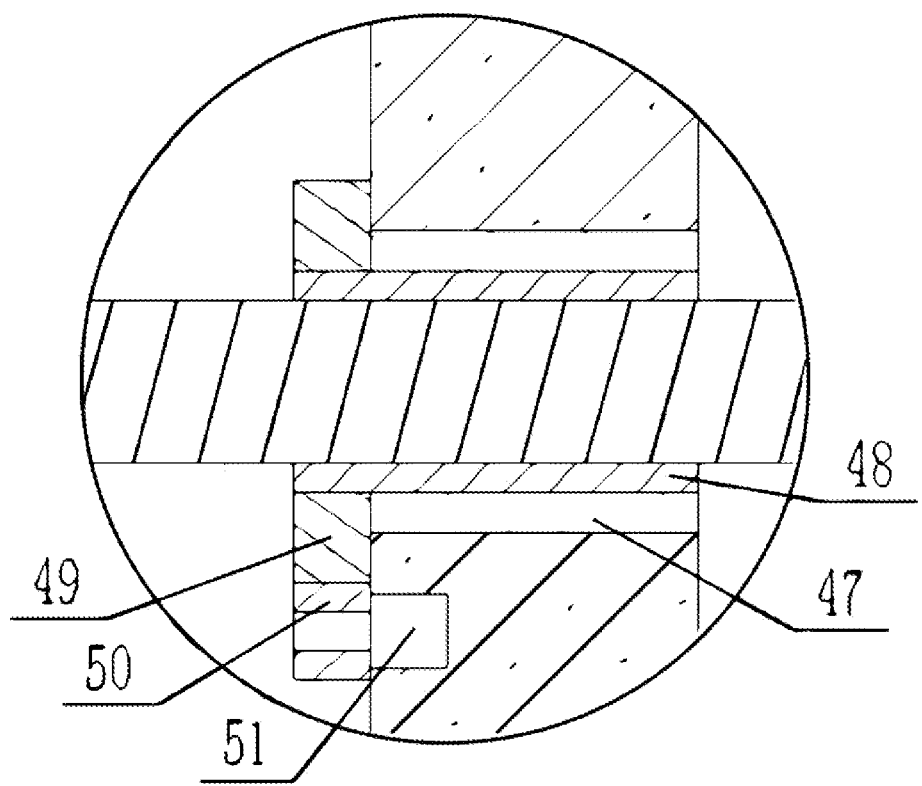
FIG. 9 is a partial enlarged view of A2 in embodiment 2 of the present application.

With reference to FIGS. 8-9, since various crops require various row spacing for growth and development, this embodiment proposes a control mechanism. The control mechanism includes a distance adjusting screw 46. The distance adjusting screw 46 runs through a plurality of frames 2, and two ends of the distance adjusting screw 46 are respectively fixedly connected with two inner walls of the fixed frame 1. The side of frame 2 is provided with a distance adjusting hole, and an outer wall of a bearing 47 is fixedly connected in the distance adjusting hole. An inner wall of the bearing 47 is fixedly connected with a threaded cylinder 48, the threaded cylinder 48 is connected with the distance adjusting screw 46 through threads, and an outer wall of the threaded cylinder 48 is fixedly connected with a driven gear 49, the driven gear 49 is meshed with a driving gear 50. A distance adjusting motor 51 is embedded in the side of the frame 2, and an output end of the distance adjusting motor 51 is fixedly connected with the driving gear 50. With this arrangement, a position of each frame 2 is adjusted separately, and the planting row spacing is adjusted.

Embodiment 3

Figure 10:
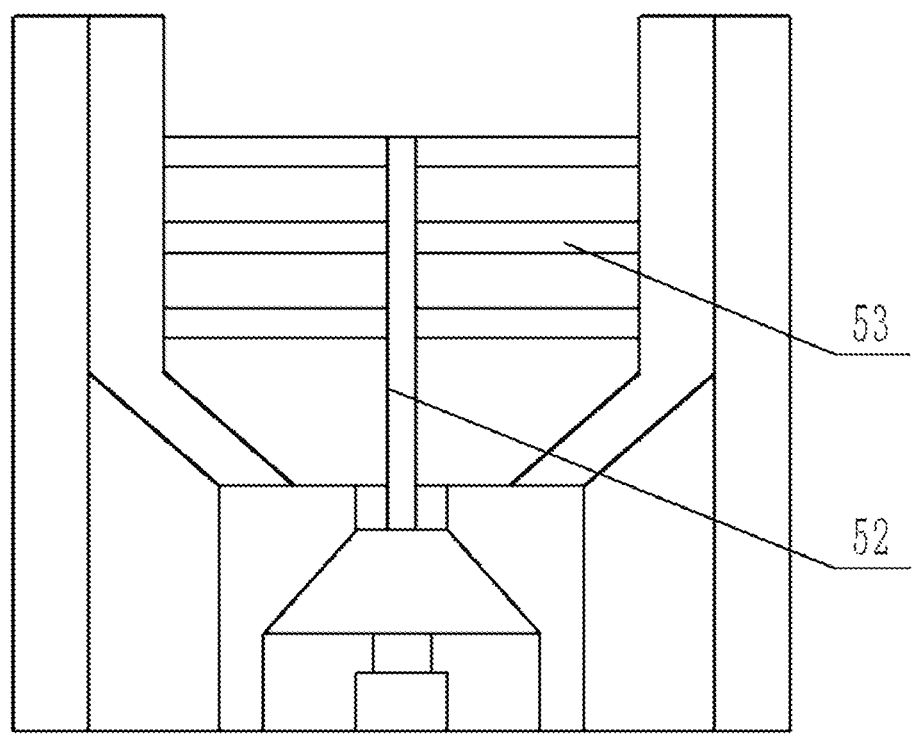
FIG. 10 is a structural diagram of embodiment 3 of the present application.

With reference to FIG. 10, in a process of applying fertilizer, it is usually necessary to mix a variety of fertilizers to supply various nutritional elements to crops. In order to save a manual stirring process, this embodiment proposes a stirring mechanism. The stirring mechanism includes a stirring rod 52, a bottom surface of the stirring rod 52 is fixedly connected with the top surface of the conical block 32, and a top outer wall of the stirring rod 52 is provided with a plurality of stirring struts 53, so as to stir the fertilizer simultaneously during grinding of fertilizer.

Embodiment 4

Figure 11:
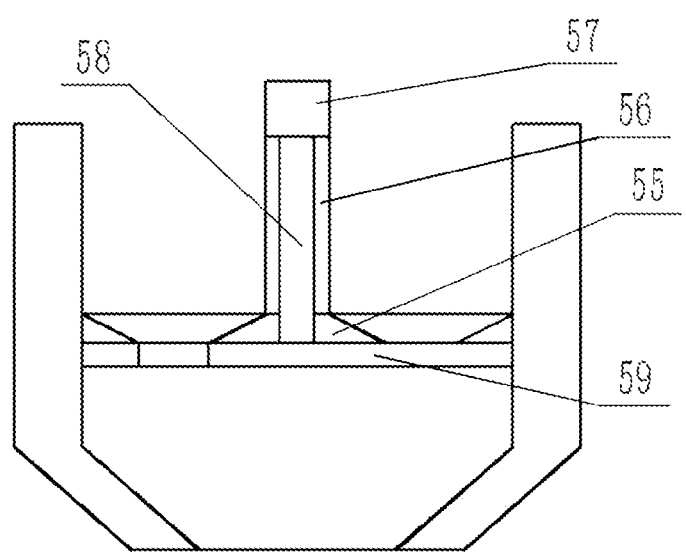
FIG. 11 is a structural diagram of embodiment 4 of the present application.
Figure 12:
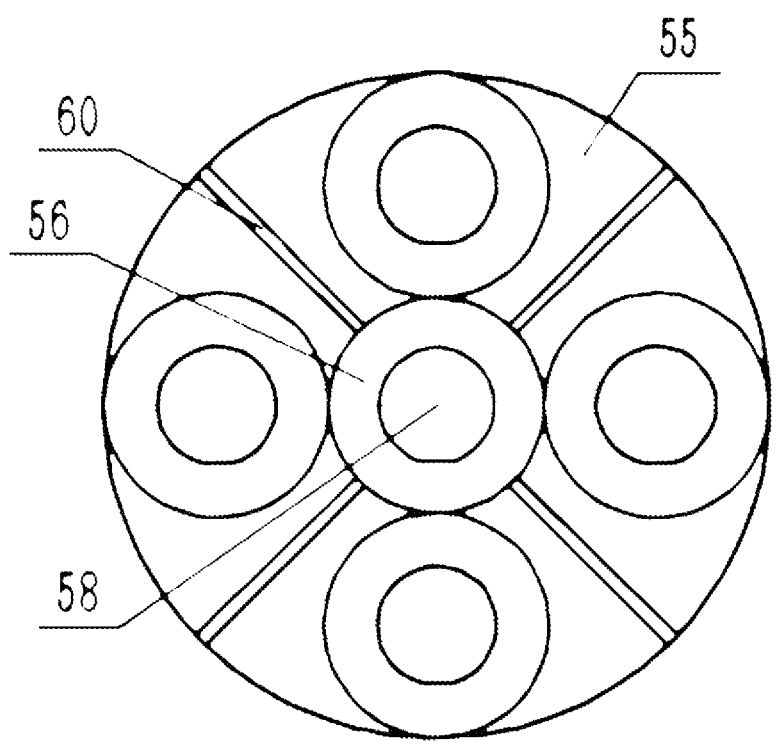
FIG. 12 is a structural diagram of a discharge plate in embodiment 4 of the present application.

With reference to FIGS. 11-12, in order to realize the intercropping of crops in a process of reciprocating sowing by a machine on edge of field, this embodiment proposes two conversion devices. The conversion devices are respectively arranged in the fertilizer loading cylinder 29 and the seeding shell 37, and are respectively arranged at the top of the inner cavities of the fertilizer loading cylinder 29 and the seeding shell 37. Each conversion device respectively arranged in the fertilizer loading cylinder and seeding shell includes a discharging plate 55. A peripheral wall of each discharging plate 55 is fixedly connected with the inner wall of the fertilizer loading cylinder 29, a center of a top surface of each discharging plate 55 is fixedly connected with a transmission cylinder 56, a top surface of each transmission cylinder 56 is fixedly connected with a conversion motor 57, an output end of each conversion motor 57 is fixedly connected with a conversion shaft 58, a bottom surface of each conversion shaft 58 sequentially penetrates through the inner cavity of each transmission cylinder 56 and the top surface of each discharging plate 55 is fixedly connected with a conversion plate 59, and the top surface of each conversion plate 59 is in sliding contact with the bottom surface of the respective discharging plate 55. The peripheral wall of each transmission cylinder 56 is fixedly connected with a plurality of partition plates 60 at equal intervals in the circumferential direction, sides of the partition plates 60 are fixedly connected with the inner wall of the fertilizer loading cylinder 29, and the top of the inner cavity of the fertilizer loading cylinder 29 is equally divided into a plurality of partition areas for respectively holding various fertilizer. In this embodiment, two partition areas are defined for respectively holding two kinds of fertilizer for two kinds of seeds. Each discharging plate 55 in the partition areas is provided with a tapered hole, and the top surface of each conversion plate 59 is provided with a conversion hole matched with each tapered hole. The two conversion devices have same structures. While the machine is plowing on the edge of field, each conversion motor 57 drives each conversion shaft 58 to rotate, so that the conversion holes are respectively aligned with different tapered holes, thus achieving the effect of discharging various seeds and fertilizers, and realizing the continuous operation of the machine.

In the description of the present application, it should be noted that the directions or position relationships indicated by the terms "longitudinal", "transverse", "upper", "lower", "front", "rear", "left", "right", "vertical", "horizontal", "top", "bottom", "inner", "outer" are based on the directions or position relationships shown in the drawings, which are only for the convenience of describing the present application, rather than indicating or implying that the devices or elements must be in designated directions, or configured or operated in designated directions so that they cannot be understood as the limitation of this application.

What is claimed is:

1. An intelligent seeding and fertilizing machine for intercropping, comprising: a fixed frame, wherein a plurality of seeding devices are arranged in the fixed frame in parallel, and a plurality of the seeding devices are respectively used for sowing various seeds for intercropping and alternately sowing at intervals;

each seeding device comprises a frame, a plurality of guide columns are fixedly connected in the fixed frame, and a plurality of the guide columns penetrate through a side surface of the frame, and a bottom surface of the frame is respectively provided with a cutting mechanism, a cleaning mechanism, a furrowing mechanism, a fertilizing mechanism, a seeding mechanism and a soil covering mechanism in sequence; one end of the fixed frame close to the cutting mechanism is provided with a lifting plate, a bottom surface of the lifting plate is fixedly connected with a plurality of guide wheels; one side of the lifting plate is provided with a lifting groove; a side surface of the fixed frame is in sliding contact with an inner wall of the lifting groove; a top of the fixed frame is provided with a lifting hole; a top of the lifting plate is fixedly connected with a lifting motor; a lifting screw is arranged in the lifting groove; an outer wall of the lifting screw is connected with an inner wall of the lifting hole through threads; a top of the lifting screw penetrates through the top surface of the lifting groove and is fixedly connected with an output end of the lifting motor; a bottom surface of the lifting screw is rotatably connected with a bottom surface of the lifting groove; the other side of the lifting plate is fixedly connected with a connecting seat, the connecting seat is connected with agricultural machinery through bolts; and the lifting motor, the cutting mechanism, the cleaning mechanism, the furrowing mechanism, the fertilizing mechanism, the seeding mechanism and the soil covering mechanism are all electrically connected with a control system;

the cutting mechanism comprises two oppositely arranged cutting seats, top surfaces of the two cutting seats are respectively connected with the bottom surface of the frame, bottoms of the two cutting seats are provided with a cutting shaft, one end of the cutting shaft penetrates through one of the cutting seats and is connected with a cutting motor in a transmission way, the other end of the cutting shaft is rotatably connected with a side surface of the other cutting seat, the cutting motor is fixedly connected with the side surface of one of the cutting seats, an output end of the cutting motor is fixedly connected with the cutting shaft, a middle part of the cutting shaft is sleeved with a cutting disc, and the cutting disc is fixedly connected with an outer wall of the cutting shaft, a peripheral face of the cutting disc is circumferentially provided with a plurality of arc-shaped cutting openings at equal intervals;

the cleaning mechanism comprises two oppositely arranged cleaning seats, and top surfaces of the two cleaning seats are in contact with the bottom surface of the frame, bottom surfaces of the two cleaning seats are fixedly connected with a cleaning plate; a bottom of the cleaning plate is provided with two cleaning gears meshing with each other; a top of each cleaning gear is fixedly connected with a cleaning shaft; a top of the cleaning shaft penetrates through the cleaning plate and is connected with a cleaning motor in a transmission way; the cleaning motor is fixedly connected with the bottom of the frame; and an output end of the cleaning motor is fixedly connected with the top of the cleaning shaft; and a control mechanism, wherein the control mechanism comprises a distance adjusting screw, the distance adjusting screw runs through a plurality of frames, and two ends of the distance adjusting screw are respectively fixedly connected with two inner walls of the fixed frame, the side of frame is provided with a distance adjusting hole, and an outer wall of a bearing is fixedly connected in the distance adjusting hole; an inner wall of the bearing is fixedly connected with a threaded cylinder, the threaded cylinder is connected with the distance adjusting screw through threads, and an outer wall of the threaded cylinder is fixedly connected with a driven gear, the driven gear is meshed with a driving gear; a distance adjusting motor is embedded in the side of the frame, and an output end of the distance adjusting motor is fixedly connected with the driving gear.

2. The intelligent seeding and fertilizing machine for intercropping according to claim 1, wherein the furrowing mechanism comprises a furrowing plate, a bottom of the furrowing plate is fixedly connected with two oppositely arranged furrowing seats, and bottoms of the furrowing seats are provided with a furrowing shaft, one end of the furrowing shaft runs through one of the furrowing seats and is connected with a furrowing motor in transmission, the other end of furrowing shaft is rotatably connected with a side of the other furrowing seat, and the furrowing motor is fixedly connected with a side of one of the furrowing seats; an output end of the furrowing motor is fixedly connected with the furrowing shaft; and a middle part of the furrowing shaft is sleeved with a furrowing disc, the furrowing disc is fixedly connected with an outer wall of the furrowing shaft; a peripheral face of the furrowing disc is circumferentially fixedly connected with a plurality of furrowing teeth at equal intervals; and tops of the furrowing seats are provided with a limiting mechanism.

3. The intelligent seeding and fertilizing machine for intercropping according to claim 2, wherein the limiting mechanism comprises a limiting motor, the limiting motor is fixedly connected with a top surface of the frame, and the top surface of the frame is provided with a rectangular hole, a rectangular block is arranged in the rectangular hole; an outer wall of the rectangular block is in sliding contact with an inner wall of the rectangular hole; a bottom surface of the rectangular block is fixedly connected with a top surface of the furrowing plate; a top surface of the rectangular block is provided with a limiting hole; and an output end of the limiting motor is fixedly connected with a limiting shaft, and the limiting shaft is connected with an inner wall of the limiting hole through threads.

4. The intelligent seeding and fertilizing machine for intercropping according to claim 3, wherein the fertilizing mechanism comprises a positioning cylinder, a bottom surface of the positioning cylinder is fixedly connected with the top surface of the frame, and a fertilizer loading cylinder is arranged in the positioning cylinder, a top outer wall of the fertilizer loading cylinder is fixedly connected with an top inner wall of the positioning cylinder, a bottom of fertilizer loading cylinder is provided with a conical structure, and a bottom surface of the fertilizer loading cylinder is provided with a discharge hole, and the bottom surface of fertilizer loading cylinder is fixedly connected with a grinding cylinder, a bottom surface of the grinding cylinder is fixedly connected with the top surface of the frame; a top of an inner wall of the grinding cylinder is provided with an inverted conical structure, the discharge hole is communicated with an inner cavity of the grinding cylinder, the top surface of the frame is fixedly connected with a grinding motor, and an output end of the grinding motor is fixedly connected with a conical block, the conical block is matched with the shape of an inner cavity of a top of the grinding cylinder, a gap is provided between the conical block and the top of the inner wall of the grinding cylinder, the top surface of the frame located in the grinding cylinder is provided with an inclined annular groove, and a bottom surface of the annular groove is provided with a fertilizer discharging hole; and an outlet end of the fertilizer discharging hole is fixedly connected with a fertilizer guiding tube.

5. The intelligent seeding and fertilizing machine for intercropping according to claim 4, wherein a bottom surface of the conical block is fixedly connected with a connecting rod, and a bottom surface of the connecting rod is fixedly connected with a sweeping rod, and a bottom surface of the sweeping rod is in sliding contact with the bottom surface of the annular groove.

6. The intelligent seeding and fertilizing machine for intercropping according to claim 5, wherein the seeding mechanism comprises a seeding shell, a bottom of the seeding shell is provided with a conical structure, a bottom surface of the seeding shell is fixedly connected with the top surface of the frame, the top surface of the frame is provided with a communication hole, and the bottom surface of the frame is fixedly connected with a rectangular shell, a seed metering roller is arranged in the rectangular shell, and a peripheral surface of the seed metering roller is circumferentially provided with a plurality of storage tanks, and an outer wall of the seed metering roller is in sliding contact with an inner wall of the rectangular shell; one end of the seed metering roller is rotatably connected with the inner wall of the rectangular shell, and the other end of the seed metering roller penetrates through the inner wall of the rectangular shell and is fixedly connected with an output end of a seeding motor, and the seeding motor is fixedly connected with an outer wall of the rectangular shell.

7. The intelligent seeding and fertilizing machine for intercropping according to claim 6, wherein the soil covering mechanism comprises two oppositely arranged hinge seats, top surfaces of the two hinge seats are fixedly connected with the bottom surface of the frame, a hinge shaft is arranged between the two hinge seats, two ends of the hinge shaft are fixedly connected with sides of the two hinge seats respectively, two hinge rods are sleeved on the hinge seats, and soil covering rollers are arranged at bottoms of the two hinge rods, and the two ends of the soil covering rollers are rotatably connected with sides of the two hinge rods respectively.

8. The intelligent seeding and fertilizing machine for intercropping according to claim 7, wherein the control system comprises a single chip microcomputer, and a bottom of a side of the lifting plate is provided with a displacement sensor; the single chip microcomputer is electrically connected with the lifting motor, the cutting motor, the cleaning motor, the furrowing motor, the limiting motor, the grinding motor, the displacement sensor and the seeding motor respectively.

* * * * *